(12) United States Patent
Kim et al.

(10) Patent No.: US 10,148,976 B2
(45) Date of Patent: *Dec. 4, 2018

(54) METHOD FOR GENERATING PREDICTION BLOCK IN AMVP MODE

(71) Applicant: IBEX PT HOLDINGS CO., LTD., Seoul (KR)

(72) Inventors: Kwangje Kim, Seoul (KR); Hyunoh Oh, Gwacheon si (KR)

(73) Assignee: IBEX PT HOLDINGS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/879,230

(22) Filed: Jan. 24, 2018

(65) Prior Publication Data

US 2018/0152722 A1  May 31, 2018

Related U.S. Application Data

(63) Continuation of application No. 14/083,232, filed on Nov. 18, 2013, now Pat. No. 9,948,945, which is a (Continued)

(30) Foreign Application Priority Data

Aug. 29, 2011 (KR) .................. 10-2011-0086518

(51) Int. Cl.
  *H04N 7/12* (2006.01)
  *H04N 19/51* (2014.01)
  (Continued)

(52) U.S. Cl.
  CPC ........... *H04N 19/51* (2014.11); *H04N 19/124* (2014.11); *H04N 19/126* (2014.11); *H04N 19/13* (2014.11);
  (Continued)

(58) Field of Classification Search
  CPC ......... H04N 19/00696; H04N 19/0003; H04N 19/51; H04N 19/52; H04N 19/56;
  (Continued)

(56) References Cited

U.S. PATENT DOCUMENTS

2012/0263231 A1  10/2012  Zhou
2012/0269268 A1  10/2012  Kim et al.
(Continued)

FOREIGN PATENT DOCUMENTS

KR  10-2006-0108510 A  10/2006
KR  10-2009-0038278 A  4/2008
(Continued)

*Primary Examiner* — Gims S Philippe
(74) *Attorney, Agent, or Firm* — Birch, Stewart, Kolasch & Birch, LLP

(57) ABSTRACT

A method of encoding video data, the method including generating, via a generator, a prediction block of a current prediction unit using a reference index and a motion vector of the current prediction unit; generating, via the generator, a residual block using a difference between the current prediction unit and the prediction block; transforming, via a transformer, the residual block to generate a transform block; quantizing, via a quantizer, coefficients of the transform block to generate a quantization block using a quantization parameter, wherein the quantizer generates the quantization block by selecting two effective quantization parameters that are available and exist among left, upper, and previous quantization parameters according to an order of priority levels set for the left, upper, and previous quantization parameters and using an average of the two effective quantization parameters; and entropy-coding, via an entropy-coder, the quantization block using a scan pattern. Further, the motion vector is encoded using a motion vector predictor which is set equal to one of an effective spatial motion vector candidate and an effective temporal motion vector candidate, and when the quantized coeffi- (Continued)

cients of the quantization block are divided into a plural of subset, a same scan pattern is applied to quantized coefficients of each subset.

2 Claims, 11 Drawing Sheets

Related U.S. Application Data continuation of application No. 13/742,058, filed on Jan. 15, 2013, now abandoned, which is a continuation of application No. PCT/KR2012/000522, filed on Jan. 20, 2012.

(51) Int. Cl.
| | |
|---|---|
| *H04N 19/52* | (2014.01) |
| *H04N 19/176* | (2014.01) |
| *H04N 19/13* | (2014.01) |
| *H04N 19/593* | (2014.01) |
| *H04N 19/196* | (2014.01) |
| *H04N 19/124* | (2014.01) |
| *H04N 19/61* | (2014.01) |
| *H04N 19/126* | (2014.01) |

(52) U.S. Cl.
CPC ......... *H04N 19/176* (2014.11); *H04N 19/198* (2014.11); *H04N 19/52* (2014.11); *H04N 19/593* (2014.11); *H04N 19/61* (2014.11)

(58) Field of Classification Search
CPC ....... H04N 19/00733; H04N 19/00781; H04N 19/107; H04N 19/11; H04N 19/61; H04N 19/00042; H04N 19/0066
USPC ........................................ 375/240.01–240.29
See application file for complete search history.

(56) References Cited

U.S. PATENT DOCUMENTS

| | | | |
|---|---|---|---|
| 2012/0320968 A1 | 12/2012 | Zheng et al. | |
| 2012/0320969 A1* | 12/2012 | Zheng | H04N 19/40 375/240.02 |
| 2012/0320984 A1 | 12/2012 | Zhou | |
| 2013/0003843 A1* | 1/2013 | Guo | H04N 19/105 375/240.16 |
| 2013/0016788 A1* | 1/2013 | Oh | H04N 19/107 375/240.16 |
| 2013/0022122 A1* | 1/2013 | Oh | H04N 19/56 375/E7.243 |
| 2013/0163668 A1 | 6/2013 | Chen et al. | |
| 2015/0049805 A1* | 2/2015 | Zhou | H04N 19/176 375/240.03 |

FOREIGN PATENT DOCUMENTS

| | | |
|---|---|---|
| KR | 10-2011-0027480 A | 3/2011 |
| KR | 10-2011-0090841 A | 8/2011 |
| WO | WO 2012/030193 A2 | 3/2012 |

* cited by examiner

METHOD FOR GENERATING PREDICTION BLOCK IN AMVP MODE

CROSS-REFERENCE TO RELATED APPLICATIONS

This application is a Continuation of co-pending U.S. patent application Ser. No. 14/083,232, filed on Nov. 18, 2013, which is a Continuation of U.S. patent application Ser. No. 13/742,058 filed on Jan. 15, 2013, which is Continuation of PCT International Application No. PCT/KR2012/000522, filed on Jan. 20, 2012, and which claims priority to Application No. 10-2011-0086518, filed in the Republic of Korea on Aug. 29, 2011, all of which are hereby expressly incorporated by reference into the present application.

BACKGROUND OF THE INVENTION

Field of the Invention

The present invention relates to a method for generating a prediction block of an image that has been encoded in Advanced Motion Vector Prediction (AMVP) mode, and more particularly, to a method for decoding motion information encoded in AMVP mode and generating a prediction block based on the motion information.

Discussion of the Related Art

Many techniques have been proposed to effectively compress a video signal with a video quality maintained. Particularly, inter-prediction coding is one of the most effective video compression techniques, in which a block similar to a current block is extracted from a previous picture and the difference between the current block and the extracted block is encoded.

However, motion information about each block should be additionally transmitted in the inter-prediction coding scheme, with a coded residual block. Therefore, effective coding of motion information that reduces the amount of data is another video compression technique.

In motion estimation coding, a block best matching to a current block is searched in a predetermined search range of a reference picture using a predetermined evaluation function. Once the best matching block is searched in the reference picture, only the residue between the current block and the best matching block is transmitted, thereby increasing a data compression rate.

To decode the current block when coded through motion estimation, information about a motion vector representing a difference between a position of the current block and that of the best matching block is needed. Thus, the motion vector information is encoded and inserted into a bit stream during coding. If the motion vector information is simply encoded and inserted, overhead is increased, thereby decreasing the compression rate of video data.

Accordingly, the motion vector of the current block is predicted using neighboring blocks and only the difference between a motion vector predictor resulting from the prediction and the original motion vector is encoded and transmitted, thereby compressing the motion vector information in the inter-prediction coding scheme.

In H.264, the motion vector predictor of the current block is determined to be a median value (mvA, mvB, mvC). Since the neighboring blocks are likely to be similar to one another, the median value of the motion vectors of the neighboring blocks is determined to be the motion vector of the current block.

However, if one or more of the motion vectors of the neighboring blocks are different from the motion vector of the current block, the median value does not predict the motion vector of the current block effectively.

In addition, as prediction blocks are larger in size and diversified, the number of reference pictures is increased. Thus, the data amount of a residual block is reduced but the amount of motion information to be transmitted (a motion vector and a reference picture index) is increased.

Accordingly, there exists a need for a technique for more effectively reducing the amount of motion information to be transmitted. In addition, a technique for efficiently reconstructing motion information encoded in the above technique is needed.

SUMMARY OF THE INVENTION

An object of the present invention devised to solve the problem lies on a method for generating a prediction block by effectively reconstructing motion information encoded in AMVP mode.

The object of the present invention can be achieved by providing a method for generating a prediction block in AMVP mode, including reconstructing a reference picture index and a differential motion vector of a current Prediction Unit (PU), searching an effective spatial AMVP candidate for the current PU, searching an effective temporal AMVP candidate for the current PU, generating an AMVP candidate list using the effective spatial and temporal AMVP candidates, adding a motion vector having a predetermined value as a candidate to the AMVP candidate list, when the number of the effective AMVP candidates is smaller than a predetermined number, determining a motion vector corresponding to an AMVP index of the current PU from among motion vectors included in the AMVP candidate list to be a motion vector predictor of the current PU, reconstructing a motion vector of the current PU using the differential motion vector and the motion vector predictor, and generating a prediction block corresponding to a position indicated by the reconstructed motion vector within a reference picture indicated by the reference picture index.

In the method for generating a prediction block in AMVP mode according to the present invention, a reference picture index and a differential motion vector of a current prediction unit are reconstructed and an AMVP candidate list is made using effective spatial and temporal AMVP candidates of the current prediction unit. If the number of the effective AMVP candidates is smaller than a predetermined number, a motion vector having a predetermined value is added to the AMVP candidate list. Then, a motion vector corresponding to an AMVP index of the current prediction unit is selected as a motion vector predictor of the current prediction unit from among motion vectors included in the AMVP candidate list. A motion vector of the current prediction unit is reconstructed using the differential motion vector and the motion vector predictor and a prediction block corresponding to a position indicated by the reconstructed motion vector in a reference picture indicated by the reference picture index is generated.

Since motion information of the current prediction unit is predicted better using the spatial and temporal motion vector candidates, the amount of coded information is reduced.

Furthermore, an accurate prediction block can be generated fast by decoding motion information encoded in AMVP mode very effectively.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DESCRIPTION OF THE EMBODIMENTS

Figure 1:
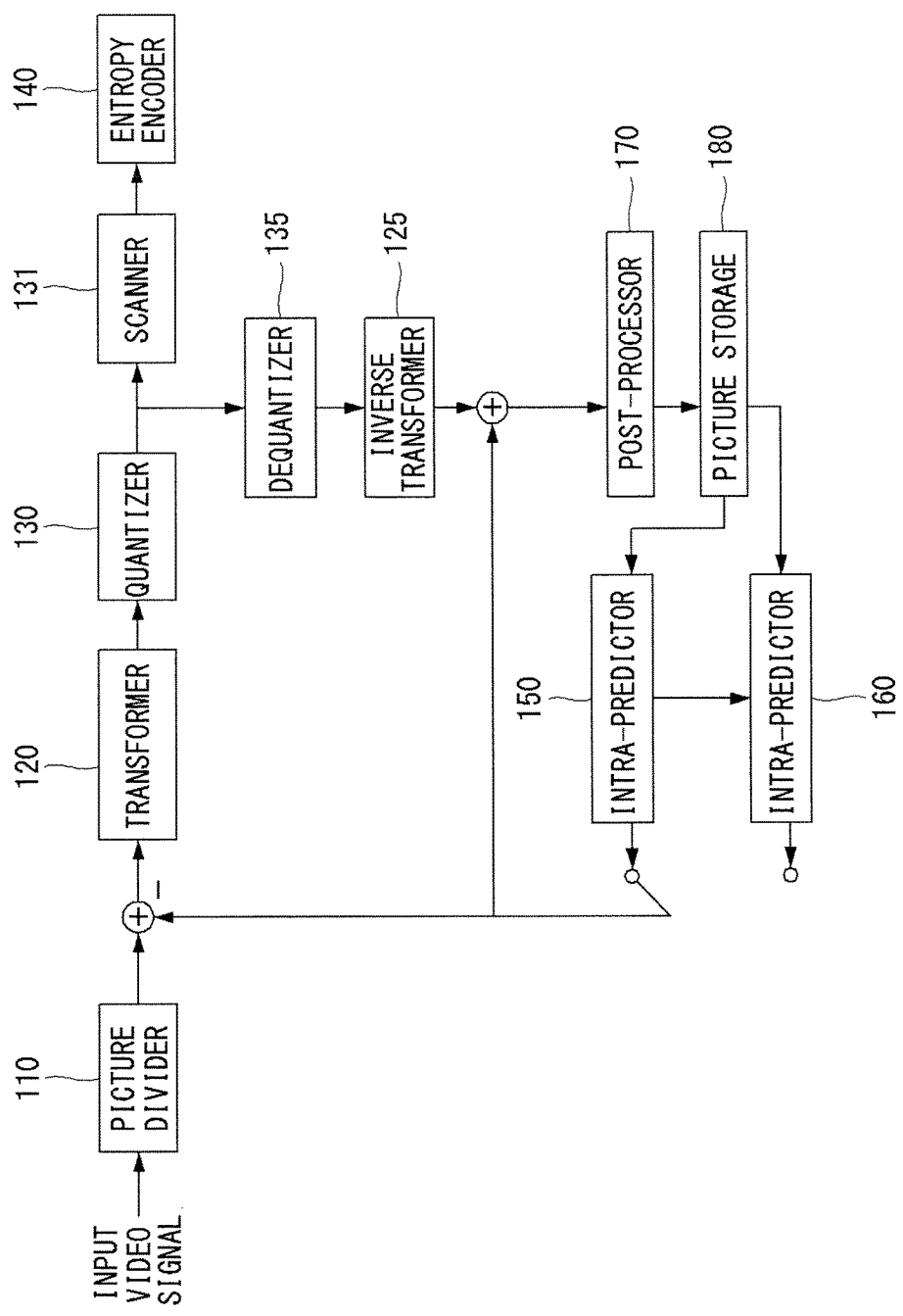
FIG. 1 is a block diagram of a video encoder according to an embodiment of the present invention.

FIG. 1 is a block diagram of a video encoder according to an embodiment of the present invention.

Referring to FIG. 1, a video encoder 100 according to the present invention includes a picture divider 110, a transformer 120, a quantizer 130, a scanner 131, an entropy encoder 140, an intra-predictor 150, an inter-predictor 160, an inverse quantizer 135, an inverse transformer 125, a post-processor 170, a picture storage 180, a subtractor 190, and an adder 195.

The picture divider 110 partitions every Largest Coding Unit (LCU) of a picture into CUs each having a predetermined size by analyzing an input video signal, determines a prediction mode, and determines a size of a Prediction Unit (PU) for each CU. The picture divider 110 provides a PU to be encoded to the intra-predictor 150 or the inter-predictor 160 according to a prediction mode (or prediction method).

The transformer 120 transforms a residual block which indicates a residual signal between the original block of an input PU and a prediction block generated from the intra-predictor 150 or the inter-predictor 160. The residual block is composed of CU or PU. The residual block is divided into optimum transform units and then transformed. A transform matrix may be differently determined based on a prediction mode (i.e. inter-prediction mode or intra-prediction mode). Because an intra-prediction residual signal includes directionality corresponding to the intra-prediction mode, a transform matrix may be determined for the intra-prediction residual signal adaptively according to the intra-prediction mode. Transform units may be transformed by two (horizontal and vertical) one-dimensional transform matrices. For example, a predetermined single transform matrix is determined for inter-prediction. On the other hand, in case of intra-prediction, if the intra-prediction mode is horizontal, the residual block is likely to be directional horizontally and thus a Discrete Cosine Transform (DCT)-based integer matrix and a Discrete Sine Transform (DST)-based or Karhunen-Loeve Transform (KLT)-based integer matrix are respectively applied vertically and horizontally. If the intra-prediction mode is vertical, a DST-based or KLT-based integer matrix and a DCT-based integer matrix are respectively applied vertically and horizontally. In DC mode, a DCT-based integer matrix is applied in both directions. In addition, in case of intra-prediction, a transform matrix may be determined adaptively according to the size of a transform unit.

The quantizer 130 determines a quantization step size to quantize the coefficients of the residual block transformed using the transform matrix. The quantization step size is determined for each CU of a predetermined size or larger (hereinafter, referred to as a quantization unit). The predetermined size may be 8×8 or 16×16. The coefficients of the transformed block are quantized using the determined quantization step size and the quantization matrix determined according to the prediction mode. The quantizer 130 uses the quantization step size of a quantization unit adjacent to a current quantization unit as a quantization step size predictor of the current quantization unit.

The quantizer 130 may generate the quantization step size predictor of the current quantization unit using one or two effective quantization step sizes resulting from sequential search of left, upper, and top-left quantization units adjacent to the current quantization unit. For example, the first one of effective quantization step sizes detected by searching the left, upper, and top-left quantization units in this order may be determined to be the quantization step size predictor. In addition, the average of the two effective quantization step sizes may be determined to be the quantization step size predictor. If only one quantization step size is effective, it may be determined to be the quantization step size predictor. Once the quantization step size predictor is determined, the difference between the quantization step size of the current CU and the quantization step size predictor is transmitted to the entropy encoder 140.

All of the left, upper, and top-left CUs adjacent to the current CU may not exist. However, there may be a previous CU in an LCU according to a coding order. Therefore, the quantization step sizes of the adjacent quantization units of the current CU and the quantization step size of the quantization unit previously encoded in the coding order within the LCU may be candidates. In this case, 1) the left quantization unit of the current CU, 2) the upper quantization unit of the current CU, 3) the top-left quantization unit of the current CU, and 4) the previously encoded quantization unit may be prioritized in a descending order. The order of priority levels may be changed and the top-left quantization unit may be omitted.

The quantized transformed block is provided to the inverse quantizer 135 and the scanner 131.

The scanner 131 converts the coefficients of the quantized transformed block to one-dimensional quantization coefficients by scanning the coefficients of the quantized transformed block. Since the coefficient distribution of the transformed block may be dependent on the intra-prediction mode after quantization, a scanning scheme is determined according to the intra-prediction mode. In addition, the coefficient scanning scheme may vary with the size of a transform unit. A scan pattern may be different according to a directional intra-prediction mode. The quantized coefficients are scanned in a reverse order.

In the case where the quantized coefficients are divided into a plurality of subsets, the same scan pattern applies to the quantization coefficients of each subset. A zigzag or diagonal scan pattern applies between subsets. Although scanning from a main subset including a DC to the remaining subsets in a forward direction is preferable, scanning in a reverse direction is also possible. The inter-subset scan pattern may be set to be identical to the intra-subset scan pattern. In this case, the inter-subset scan pattern is determined according to an intra-prediction mode. Meanwhile, the video encoder transmits information indicating the position of a last non-zero quantized coefficient in the transform unit to a video decoder. The video encoder may also transmit information indicating the position of a last non-zero quantized coefficient in each subset to the decoder.

The inverse quantizer 135 dequantizes the quantized coefficients. The inverse transformer 125 reconstructs a spatial-domain residual block from the inverse-quantized transformed coefficients. The adder generates a reconstructed block by adding the residual block reconstructed by the inverse transformer 125 to a prediction block received from the intra-predictor 150 or the inter-predictor 160.

The post-processor 170 performs deblocking filtering to eliminate blocking artifact from a reconstructed picture, adaptive offset application to compensate for a difference from the original picture on a pixel basis, and adaptive loop filtering to compensate for a difference from the original picture on a CU basis.

Deblocking filtering is preferably applied to the boundary between a PU and a transform unit which are of a predetermined size or larger. The size may be 8×8. The deblocking filtering process includes determining a boundary to be filtered, determining a boundary filtering strength to apply to the boundary, determining whether to apply a deblocking filter, and selecting a filter to apply to the boundary when determined to apply the deblocking filter.

It is determined whether to apply a deblocking filter according to i) whether the boundary filtering strength is larger than 0 and ii) whether a variation of pixels at the boundary between two blocks (a P block and a Q block) adjacent to the boundary to be filtered is smaller than a first reference value determined based on a quantization parameter.

For the deblocking filtering, two or more filters are preferable. If the absolute value of the difference between two pixels at the block boundary is equal to or larger than a second reference value, a filter that performs relatively weak filtering is selected. The second reference value is determined by the quantization parameter and the boundary filtering strength.

Adaptive offset application is intended to reduce the difference (i.e. distortion) between pixels in a deblocking-filtered picture and original pixels. It may be determined whether to perform the adaptive offset applying process on a picture basis or on a slice basis. A picture or slice may be divided into a plurality of offset areas and an offset type may be determined per offset area. There may be a predetermined number of (e.g. 4) edge offset types and two band offset types. In case of an edge offset type, the edge type of each pixel is determined and an offset corresponding to the edge type is applied to the pixel. The edge type is determined based on the distribution of two pixel values adjacent to a current pixel.

Adaptive loop filtering may be performed based on a comparison value between an original picture and a reconstructed picture that has been subjected to deblocking filtering or adaptive offset application. Adaptive loop filtering may apply across all pixels included in a 4×4 or 8×8 block. It may be determined for each CU whether to apply adaptive loop filtering. The size and coefficient of a loop filter may be different for each CU. Information indicating whether an adaptive loop filter is used for each CU may be included in each slice header. In case of a chrominance signal, the determination may be made on a picture basis. Unlike luminance, the loop filter may be rectangular.

A determination as to whether to use adaptive loop filtering may be made on a slice basis. Therefore, information indicating whether the adaptive loop filtering is used for a current slice is included in a slice header or a picture header. If the information indicates that the adaptive loop filtering is used for the current slice, the slice header or picture header further may include information indicating the horizontal and/or vertical filter length of a luminance component used in the adaptive loop filtering.

The slice header or picture header may include information indicating the number of filter sets. If the number of filter sets is 2 or larger, filter coefficients may be encoded in a prediction scheme. Accordingly, the slice header or picture header may include information indicating whether filter coefficients are encoded in a prediction scheme. If the prediction scheme is used, predicted filter coefficients are included in the slice header or picture header.

Meanwhile, chrominance components as well as luminance components may be filtered adaptively. Therefore, information indicating whether each chrominance component is filtered or not may be included in the slice header or picture header. In this case, information indicating whether chrominance components Cr and Cb are filtered may be jointly encoded (i.e. multiplexed coding) to thereby reduce the number of bits. Both chrominance components Cr and Cb are not filtered in many cases to thereby reduce complexity. Thus, if both chrominance components Cr and Cb are not filtered, a lowest index is assigned and entropy-encoded. If both chrominance components Cr and Cb are filtered, a highest index is assigned and entropy-encoded.

The picture storage 180 receives post-processed image data from the post-processor 170, reconstructs and stores an image on a picture basis. A picture may be an image in a frame or field. The picture storage 180 includes a buffer (not shown) for storing a plurality of pictures.

The inter-predictor 160 estimates a motion using at least one reference picture stored in the picture storage 180 and determines a reference picture index identifying the reference picture and a motion vector. The inter-predictor 160 extracts and outputs a prediction block corresponding to a PU to be encoded from the reference picture used for motion estimation among the plurality of reference pictures stored in the picture storage 180, according to the determined reference picture index and motion vector.

The intra-predictor 150 performs intra-prediction coding using reconfigured pixel values of a picture including the current PU. The intra-predictor 150 receives the current PU to be prediction-encoded, selects one of a predetermined number of intra-prediction modes according to the size of the current block, and performs intra-prediction in the selected intra-prediction mode. The intra-predictor 150 adaptively filters reference pixels to generate an intra-prediction block. If the reference pixels are not available, the intra-predictor 150 may generate reference pixels using available reference pixels.

The entropy encoder 140 entropy-encodes the quantized coefficients received from the quantizer 130, intra-prediction information received from the intra-predictor 150, and motion information received from the inter-predictor 160.

Figure 2:
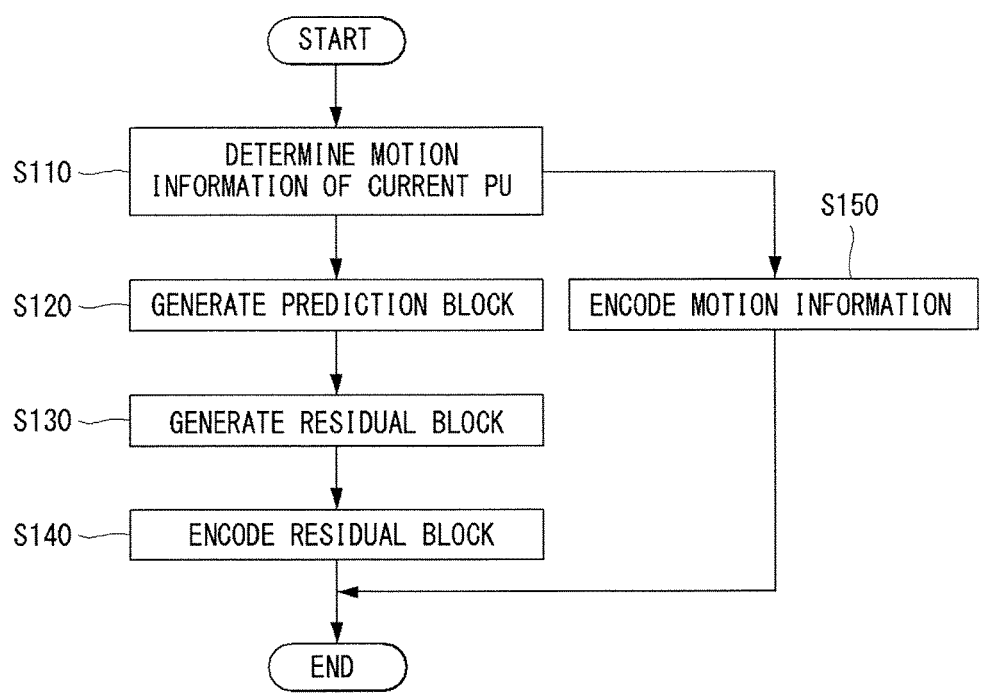
FIG. 2 is a flowchart illustrating an inter-prediction coding operation according to an embodiment of the present invention.

FIG. 2 is a flowchart illustrating an inter-prediction coding operation according to an embodiment of the present invention.

The inter-prediction coding operation includes determining motion information of a current PU, generating a prediction block, generating a residual block, encoding the residual block, and encoding the motion information. Hereinafter, a PU and a block will be used interchangeably.

Determination of motion information of a current PU (S110)

The motion information of the current PU includes a reference picture index to be referred to for the current PU and a motion vector.

To determine a prediction block of the current PU, one of one or more reconstructed reference pictures is determined to be a reference picture for the current PU and motion information indicating the position of the prediction block in the reference picture is determined.

The reference picture index for the current block may be different according to the inter-prediction mode of the current block. For example, if the current block is in a single-directional prediction mode, the reference picture index indicates one of reference pictures listed in List 0 (L0). On the other hand, if the current block is in a bi-directional prediction mode, the motion information may include reference picture indexes indicating one of reference pictures listed in L0 and one of reference pictures listed in List 1 (L1). In addition, if the current block is in a bi-directional prediction mode, the motion information may include a reference picture index indicating one or two of reference pictures included in a List Combination (LC) being a combination of L0 and L1.

The motion vector indicates the position of the prediction block in a picture indicated by the reference picture index. The motion vector may have an integer-pixel resolution or a ⅛ or 1/16 pixel resolution. If the motion vector does not have an integer-pixel resolution, the prediction block is generated from integer pixels.

(2) Generation of a Prediction Block (S120)

If the motion vector has an integer-pixel resolution, a prediction block of the current PU is generated by copying a corresponding block at the position indicated by the motion vector in the picture indicated by the reference picture index.

On the other hand, if the motion vector does not have an integer-pixel resolution, the pixels of a prediction block are generated using integer pixels in the picture indicated by the reference picture index. In case of luminance pixels, prediction pixels may be generated using an 8-tap interpolation filter. In case of chrominance pixels, prediction pixels may be generated using a 4-tap interpolation filter.

(3) Generation of a Residual Block (S130) and Coding of the Residual Block (S140)

When prediction blocks of the current PU are generated, a residual block is generated based on a difference between the current PU and the prediction block. The size of the residual block may be different from the size of the current PU. For example, if the current PU is of size 2N×2N, the current PU and the residual block are of the same size. However, if the current PU is of size 2N×N or N×2N, the residual block may be a 2N×2N block. That is, when the current PU is a 2N×N block, the residual block may be configured by combining two 2N×N residual blocks. In this case, to overcome the discontinuity of the boundary between two 2N×N prediction blocks, a 2N×2N prediction block is generated by overlap-smoothing boundary pixels and then a residual block is generated using the difference between the 2N×2N original block (two current blocks) and the 2N×2N prediction block.

When the residual block is generated, the residual block is encoded in units of a transform coding size. That is, the residual block is subjected to transform encoding, quantization, and entropy encoding in units of a transform coding size. The transform coding size may be determined in a quad-tree scheme according to the size of the residual block. That is, transform coding uses integer-based DCT.

The transform-encoded block is quantized using a quantization matrix. The quantized matrix is entropy-encoded by Context-Adaptive Binary Arithmetic Coding (CABAC) or Context-Adaptive Variable-Length Coding (CAVLC).

(4) Coding of the Motion Information (S150)

The motion information of the current PU is encoded using motion information of PUs adjacent to the current PU. The motion information of the current PU is subjected to merge coding or AMVP coding. Therefore, it is determined whether to encode the motion information of the current PU by merge coding or AMVP coding and encodes the motion information of the current PU according to the determined coding scheme.

A description will be given below of a merge coding scheme with reference to FIG. 3.

Figure 3:
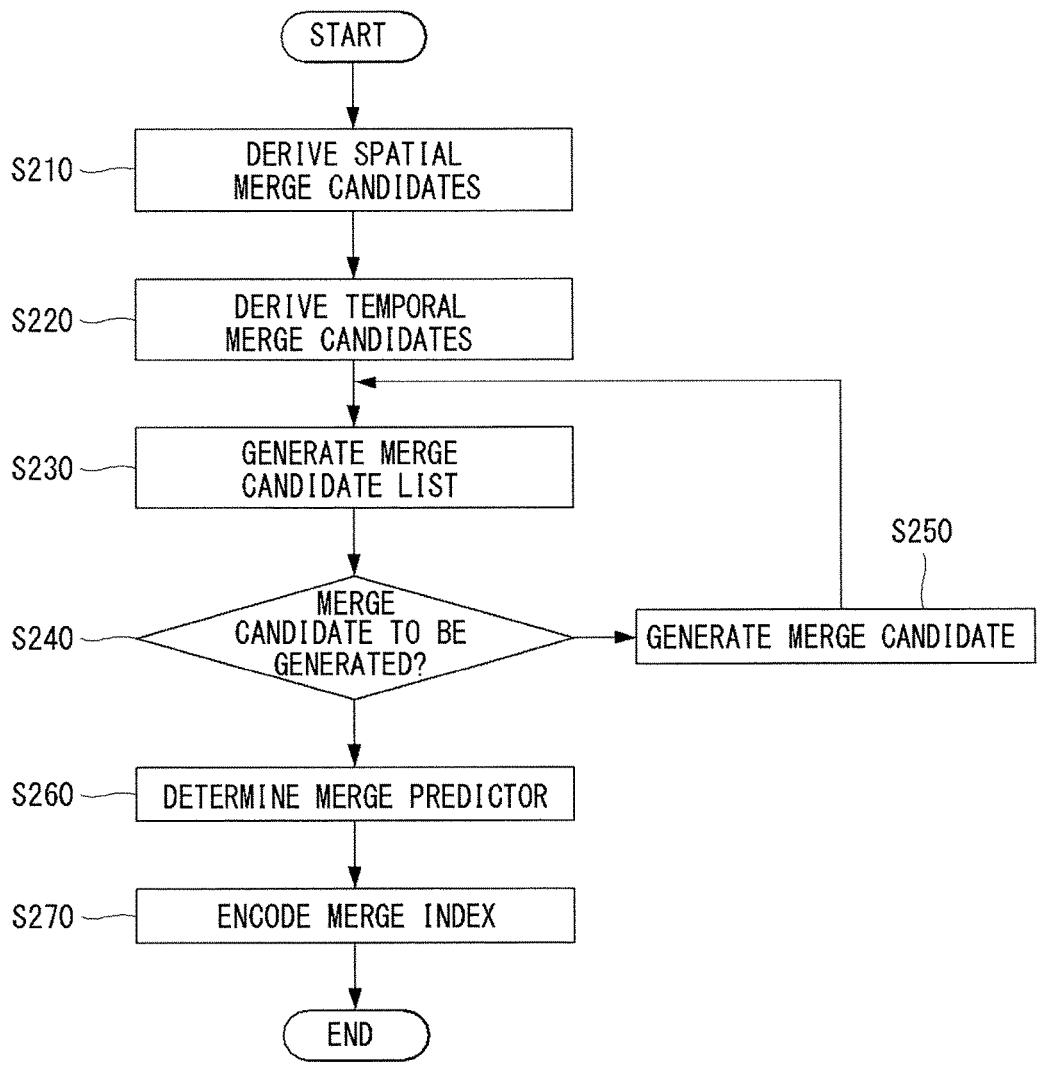
FIG. 3 is a flowchart illustrating a merge coding operation according to an embodiment of the present invention.

Referring to FIG. 3, spatial merge candidates and temporal merge candidates are derived (S210 and S220). For the convenience' sake, the spatial merge candidates are first derived and then the temporal merge candidates are derived, by way of example. However, the present invention is not limited to the order of deriving the spatial and temporal merge candidates. For example, the temporal merge candidates first derived and then the spatial merge candidates may be derived, or the spatial and temporal merge candidates may be derived in parallel.

1) Spatial Merge Candidates

Spatial merge candidates may be configured in one of the following embodiments. Spatial merge candidate configuration information may be transmitted to the video decoder. In this case, the spatial merge candidate configuration information may indicate one of the following embodiments or information indicating the number of merge candidates in one of the following embodiments.

(a) Embodiment 1 (Spatial Merge Candidate Configuration 1)

Figure 4:
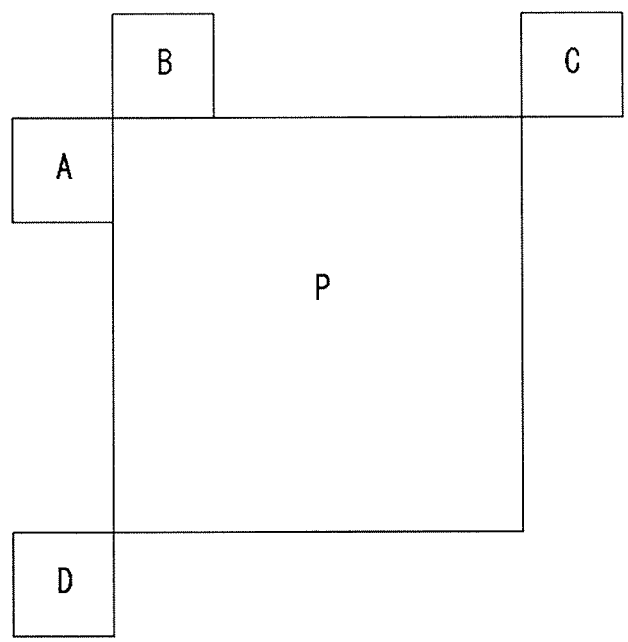
FIG. 4 illustrates the positions of merge candidates according to an embodiment of the present invention.

As illustrated in FIG. 4, a plurality of spatial merge candidates may be a left PU (block A), an upper PU (block B), a top-right PU (block C), and a bottom-left PU (block D) adjacent to the current PU. In this case, all of the effective PUs may be candidates or two effective PUs may be selected as candidates by scanning the blocks A to D in the order of A, B, C and D. If there are a plurality of PUs to the left of the current PU, an effective uppermost PU or a largest effective PU may be determined as the left PU adjacent to the current PU from among the plurality of left PUs. Similarly, if there are a plurality of PUs above the current PU, an effective leftmost PU or a largest effective PU may be determined as the upper PU adjacent to the current PU from among the plurality of upper PUs.

(b) Embodiment 2 (Spatial Merge Candidate Configuration 2)

Figure 5:
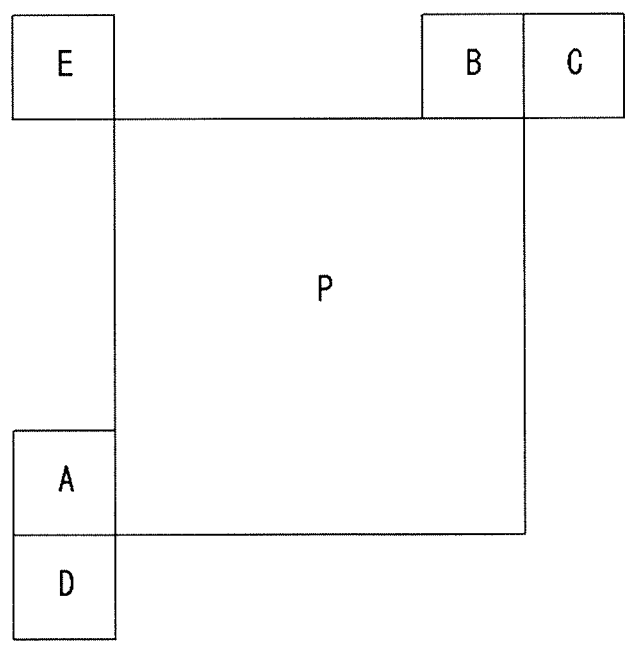
FIG. 5 illustrates the positions of merge candidates according to another embodiment of the present invention.

As illustrated in FIG. 5, a plurality of spatial merge candidates may be two effective PUs selected from among a left PU (block A), an upper PU (block B), a top-right PU (block C), a bottom-left PU (block D), and a top-left PU (block E) adjacent to the current PU by scanning the blocks A to E in the order of A, B, C, D and E. Herein, the left PU may be adjacent to the block E, not to the block D. Similarly, the upper PU may be adjacent to the block E, not to the block C.

(c) Embodiment 3 (Spatial Merge Candidate Configuration 3)

As illustrated in FIG. 5, the left block (the block A), the upper block (the block B), the top-right block (the block C), the bottom-left block (the block D), and the top-left block (the block E) adjacent to the current PU may be candidates in this order, if they are effective. In this case, the block E is available if one or more of the blocks A to D are not effective.

(d) Embodiment 4 (Spatial Merge Candidate Configuration 4)

As illustrated in FIG. 5, a plurality of spatial merge candidates may include the left PU (the block A), the upper PU (the block B), and a corner PU (one of the blocks C, D and E) adjacent to the current PU. The corner PU is a first effective one of the top-right PU (the block C), bottom-left PU (the block D), and top-left PU (the block E) of the current PU by scanning them in the order of C, D and E.

In the above embodiments, motion information of spatial merge candidates above the current PU may be set differently according to the position of the current PU. For example, if the current PU is at the upper boundary of an LCU, motion information of an upper PU (block B, C or E) adjacent to the current PU may be its own motion information or motion information of an adjacent PU. The motion information of the upper PU may be determined as one of its own motion information or motion information (a reference picture index and a motion vector) of an adjacent PU, according to the size and position of the current PU.

2) Temporal Merge Candidates

A reference picture index and a motion vector of a temporal merge candidate are obtained in an additional process. The reference picture index of the temporal merge candidate may be obtained using the reference picture index of one of PUs spatially adjacent to the current PU.

Reference picture indexes of temporal merge candidates for the current PU may be obtained using the whole or a part of reference picture indexes of the left PU (the block A), the upper PU (the block B), the top-right PU (the block C), the bottom-left PU (the block D), and the top-left PU (the block E) adjacent to the current PU. For example, the reference picture indexes of the left PU (the block A), the upper PU (the block B), and a corner block (one of the blocks C, D and E) adjacent to the current PU may be used. Additionally, the reference picture indexes of an odd number of (e.g. 3) effective PUs may be used from among the reference picture indexes of the left PU (the block A), upper PU (the block B), top-right PU (the block C), bottom-left PU (the block D), and top-left PU (the block E) adjacent to the current PU by scanning them in the order of A, B, C, D and E.

A case where the reference picture indexes of left, upper, and corner PUs adjacent to a current PU are used to obtain the reference indexes of temporal merge candidates for the current PU will be described below.

The reference picture index of the left PU (hereinafter, referred to as the left reference picture index), the reference picture index of the upper PU (hereinafter, referred to as the upper reference picture index), and the reference picture index of the corner PU (hereinafter, referred to as the corner reference picture index), adjacent to the current PU, are obtained. While only one of the corner PUs C, D and E is taken as a candidate, to which the present invention is not limited, it may be further contemplated in an alternative embodiment that the PUs C and D are set as candidates (thus four candidates) or the PUs C, D and E are all set as candidates (thus five candidates).

While three or more effective reference picture indexes are used herein, all of the effective reference picture indexes or only a reference picture index at a predetermined position may be used. In the absence of any effective reference picture index, reference picture index 0 may be set as the reference picture index of a temporal merge candidate.

If a plurality of reference picture indexes are used, a reference picture index that is most frequently used from among the reference picture indexes may be set as the reference picture index of a temporal merge candidate. When a plurality of reference picture indexes are most frequently used, a reference picture index having a minimum value among the plurality of reference picture indexes or the reference picture index of a left or upper block may be set as the reference picture index of a temporal merge candidate.

Then, an operation for obtaining a motion vector of the temporal merge candidate will be described.

A picture including the temporal merge candidate block (hereinafter, referred to as a temporal merge candidate picture) is determined. The temporal merge candidate picture may be set to a picture with reference picture index 0. In this case, if the slice type is P, the first picture (i.e. a picture with index 0) in list0 is set as a temporal merge candidate picture. If the slice type is B, the first picture of a reference picture list indicated by a flag that indicates a temporal merge candidate list in a slice header is set as a temporal merge candidate picture. For example, if the flag is 1, a temporal merge candidate picture may be selected from list0 and if the flag is 0, a temporal merge candidate picture may be selected from list1.

Subsequently, a temporal merge candidate block is obtained from the temporal merge candidate picture. One of a plurality of blocks corresponding to the current PU within the temporal merge candidate picture may be determined as the temporal merge candidate block. In this case, the plurality of blocks corresponding to the current PU are prioritized and a first effective corresponding block is selected as the temporal merge candidate block according to the priority levels.

For example, a bottom-left corner block adjacent to a block corresponding to the current PU within the temporal merge candidate picture or a bottom-left block included in the block corresponding to the current PU within the temporal merge candidate picture may be set as a first candidate block. In addition, a block including a top-left pixel or a block including a bottom-right pixel, at the center of the block corresponding to the current PU within the temporal merge candidate picture may be set as a second candidate block.

If the first candidate block is effective, the first candidate block is set as the temporal merge candidate block. On the other hand, if not the first candidate block but the second candidate block is effective, the second candidate block is set as the temporal merge candidate block. Or only the second candidate block may be used according to the position of the current PU. The current PU may be located in a slice or an LCU.

When the temporal merge candidate prediction block is determined, the motion vector of the temporal merge candidate prediction block is set as a temporal merge candidate motion vector.

Meanwhile, the temporal merge candidate may be adaptively off according to the size of the current PU. For example, if the current PU is a 4×4 block, the temporal merge candidate may be off to reduce complexity.

Then a merge candidate list is generated (S230).

The merge candidate list is generated using the effective merge candidates in a predetermined order. If a plurality of merge candidates have the same motion information (i.e. the same motion vector and the same reference picture index), a lower-ranked merge candidate is deleted from the merge candidate list.

For example, the predetermined order may be A, B, Col, C, and D in Embodiment 1 (spatial merge candidate configuration 1). Herein, Col represents a temporal merge candidate.

In Embodiment 2 (spatial merge candidate configuration 2), the merge candidate list may be generated in the order of two effective PUs and Col, the two effective PUs being determined by scanning the blocks A, B, C, D and E in this order.

In Embodiment 3 (spatial merge candidate configuration 3), the predetermined order may be A, B, Col, C, D. If at least one of the blocks A, B, C and D is not effective, the block E may be added. In this case, the block E may be added at the lowest rank. In addition, the merge candidate list may be generated in the order of (one of A and D), (one of C, B and E), and Col.

In Embodiment 4 (spatial merge candidate configuration 4), the predetermined order may be A, B, Col, Corner, or A, B, Corner, Col.

The number of merge candidates may be determined on a slice or LCU basis. In this case, the merge candidate list is generated in a predetermined order in the above embodiments.

It is determined whether to generate merge candidates (S240). In the case where the number of merge candidates is set to a fixed value, if the number of effective merge candidates is smaller than the fixed value, merge candidates are generated (S250). The generated merge candidates are added to the merge candidate list. In this case, the generated merge candidates are added below the lowest ranked merge candidate in the merge candidate list. If a plurality of merge candidates are added, they are added in a predetermined order.

The added merge candidate may be a candidate with motion vector 0 and reference picture index 0 (a first added merge candidate). In addition, the added merge candidate may be a candidate generated by combining the motion information of effective merge candidates (a second added merge candidate). For example, a candidate may be generated by combining the motion information (the reference picture index) of a temporal merge candidate with the motion information (motion vector) of an effective spatial merge candidate and then added to the merge candidate list.

Merge candidates may be added in the order of the first and second added merge candidates or in the reverse order.

On the contrary, if the number of merge candidates is variable and only effective merge candidates are used, the steps S240 and S250 may be omitted.

A merge candidate is determined as a merge predictor of the current PU, from the generated merge candidate list (S260).

Then the index of the merge predictor (i.e. the merge index) is encoded (S270). In case of a single merge candidate, the merge index is omitted. On the other hand, in case of two or more merge candidates, the merge index is encoded.

The merge index may be encoded by fixed-length coding or CAVLC. If CAVLC is adopted, the merge index for codeword mapping may be adjusted according to a PU shape and a PU index.

The number of merge candidates may be variable. In this case, a codeword corresponding to the merge index is selected using a table that is determined according to the number of effective merge candidates.

The number of merge candidates may be fixed. In this case, a codeword corresponding to the merge index is selected using a single table corresponding to the number of merge candidates.

Figure 6:
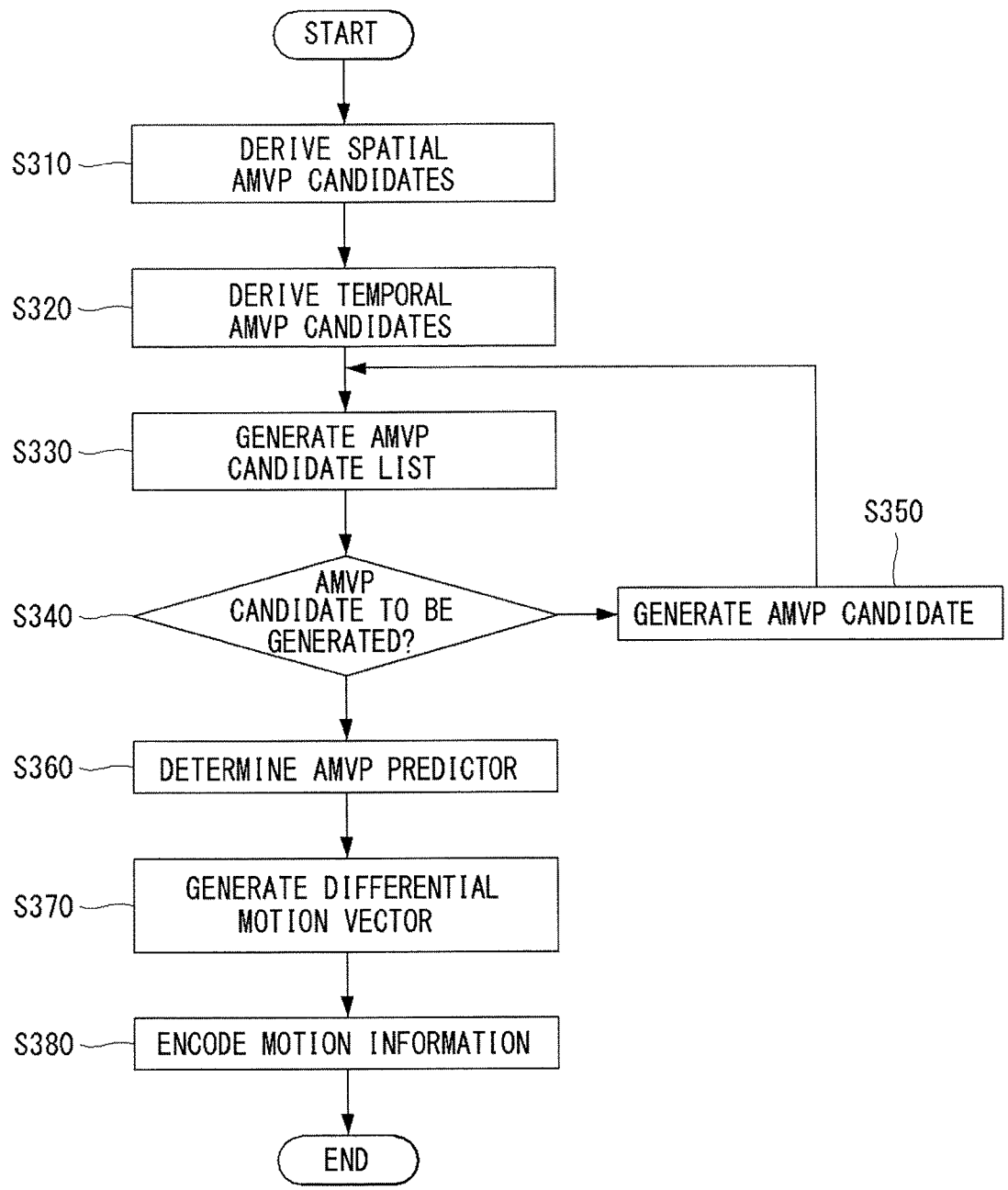
FIG. 6 is a flowchart illustrating an AMVP coding operation according to an embodiment of the present invention.

With reference to FIG. 6, an AMVP coding scheme will be described.

Referring to FIG. 6, a spatial AMVP candidate and a temporal AMVP candidate are derived (S310 and S320).

1) Spatial AMVP Candidates (a) Spatial AMVP Candidate Configuration 1

As illustrated in FIG. 5, spatial AMVP candidates may include one (a left candidate) of the left PU (the block A) and bottom-left PU (the block D) adjacent to the current PU and one (an upper candidate) of the right PU (the block B), top-right PU (the block C), and top-left PU (the block E) adjacent to the current PU. The motion vector of a first effective PU is selected as the left or upper candidate by scanning PUs in a predetermined order. The left PUs may be scanned in the order of A and D or in the order of D and A. The upper PUs may be scanned in the order of B, C and E or in the order of C, B and E.

(b) Spatial AMVP Candidate Configuration 2

As illustrated in FIG. 4, the spatial AMVP candidates may be two effective PUs selected from the left PU (the block A), upper PU (the block B), top-right PU (the block C), and bottom-left PU (the block D) adjacent to the current PU by scanning them in the order of A, B, C and D. In this case, all of effective PUs may be candidates or two effective PUs obtained by scanning the blocks A, B, C and D in this order may be candidates. If there are a plurality of PUs to the left of the current PU, an effective uppermost PU or an effective PU having a largest area may be set as the left PU. Similarly, if there are a plurality of PUs above the current PU, an effective leftmost PU or an effective PU having a largest area may be set as the upper PU.

(c) Spatial AMVP Candidate Configuration 3

As illustrated in FIG. 5, spatial AMVP candidates may include two effective PUs obtained by scanning the left PU (the block A), right PU (the block B), top-right PU (the block C), bottom-left PU (the block D), and top-left PU (the block E) adjacent to the current PU in this order. The left PU may be adjacent to the block E, not to the block D. Likewise, the upper PU may be adjacent to the block E, not to the block C.

(d) Spatial AMVP Candidate Configuration 4

As illustrated in FIG. 5, spatial AMVP candidates may be four blocks selected from among the left PU (the block A), upper PU (the block B), top-right PU (the block C), bottom-left PU (the block D), and top-left PU (the block E) adjacent to the current PU. In this case, the block E may be available when one or more of blocks A to D are not effective.

(e) Spatial AMVP Candidate Configuration 5

As illustrated in FIG. 5, spatial AMVP candidates may include the left PU (the block A), upper PU (the block B), and a corner PU (one of the blocks C, D and E) adjacent to the current PU. The corner PU is a first effective one of the top-right PU (the block C), bottom-left PU (the block D), and top-left PU (block E) of the current PU by scanning them in the order of C, D and E.

In the above embodiments, motion information of AMVP candidates above the current PU may be set differently according to the position of the current PU. For example, if the current PU is at the upper boundary of an LCU, the motion vector of an upper PU (the block B, C or E) adjacent to the current PU may be its own motion vector or the motion vector of an adjacent PU. The motion vector of the upper PU may be determined as its own motion vector or the motion vector of an adjacent PU according to the size and position of the current PU.

2) Temporal AMVP Candidate

Because a temporal AMVP candidate needs only motion information, there is no need for obtaining a reference picture index, compared to a merge candidate. An operation for obtaining the motion vector of a temporal AMVP candidate will first be described.

A picture including the temporal AMVP candidate block (hereinafter, referred to as a temporal AMVP candidate picture) is determined. The temporal AMVP candidate picture may be set to a picture with reference picture index 0. In this case, if the slice type is P, the first picture (i.e. a picture with index 0) in list0 is set as a temporal AMVP candidate picture. If the slice type is B, the first picture of a reference picture list indicated by a flag that indicates a temporal AVMP candidate list in a slice header is set as a temporal AVMP candidate picture.

Then, a temporal AMVP candidate block is obtained from the temporal AMVP candidate picture. This is performed in the same manner as the operation for obtaining a temporal merge candidate block and thus its description will not be provided herein.

Meanwhile, the temporal AMVP candidate may be adaptively off according to the size of the current PU. For example, if the current PU is a 4×4 block, the temporal AMVP candidate may be off to reduce complexity.

Then an AMVP candidate list is generated (S330).

The AMVP candidate list is generated using effective AMVP candidates in a predetermined order. If a plurality of AMVP candidates have the same motion information (i.e. it is not necessary that the reference pictures are identical), lower-ranked AMVP candidates are deleted from the AMVP candidate list.

In spatial AMVP candidate configuration 1, the predetermined order is one of A and D (the order of A and D or the order of D and A), one of B, C and E (the order of B, C and E or the order of C, B and E), and Col, or Col, one of A and D, and one of B, C and E. Herein, Col represents a temporal AMVP candidate.

In spatial AMVP candidate configuration 2, the predetermined order is A, B, Col, C, D or C, D, Col, A, B.

In spatial AMVP candidate configuration 3, the predetermined order is (two effective ones of A, B, C, D and E in this order) and Col or Col and (two effective ones of A, B, C, D and E in this order).

In spatial AMVP candidate configuration 4, the predetermined order is A, B, Col, C, and D. If at least one of the blocks A, B, C and D is not effective, the block E may be added at the lowest rank.

In spatial AMVP candidate configuration 5, the predetermined order is A, B, Col, and corner.

It is determined whether to generate AMVP candidates (S340). In the case where the number of AMVP candidates is set to a fixed value, if the number of effective AMVP candidates is smaller than the fixed value, AMVP candidates are generated (S350). The fixed value may be 2 or 3. The generated AMVP candidates are added below the lowest-ranked AMVP candidate in the AMVP candidate list. The added AMVP candidate may be a candidate with motion vector 0.

On the contrary, if the number of AMVP candidates is variable and only effective AMVP candidates are used, the steps S340 and S350 may be omitted.

A motion vector predictor of the current PU is selected from the AMVP candidate list (S360). An AMVP index indicating the predictor is generated.

Then, a differential motion vector between the motion vector of the current PU and the motion vector predictor is generated (S370).

The reference picture index of the current PU, the differential motion vector, and the AMVP index are encoded (S380). In case of a single AMVP candidate, the AMVP index may be omitted.

The AMVP index may be encoded by fixed-length coding or CAVLC. If CAVLC is adopted, the AMVP index for codeword mapping may be adjusted according to a PU shape and a PU index.

The number of AMVP candidates may be variable. In this case, a codeword corresponding to the AMVP index is selected using a table determined according to the number of effective AMVP candidates.

Meanwhile, the merge candidate block may be identical to the AMVP candidate block. For example, in the case where the AMVP candidate configuration is identical to the merge candidate configuration. Thus, encoder complexity can be reduced.

Figure 7:
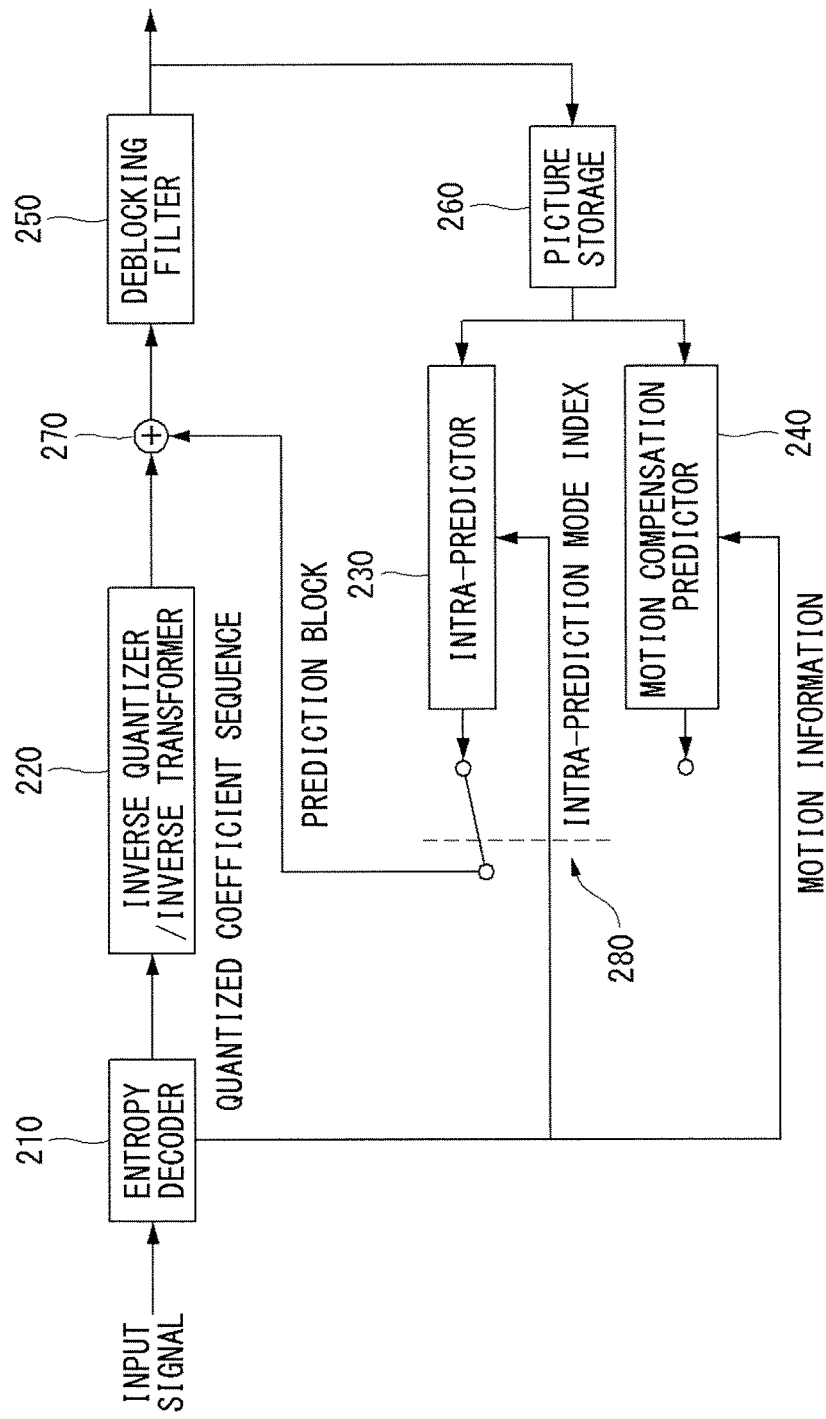
FIG. 7 is a block diagram of a video decoder according to an embodiment of the present invention.

FIG. 7 is a block diagram of a video decoder according to an embodiment of the present invention.

Referring to FIG. 7, the video decoder of the present invention includes an entropy decoder 210, an inverse quantizer/inverse transformer 220, an adder 270, a deblocking filter 250, a picture storage 260, an intra-predictor 230, a motion compensation predictor 240, and an intra/inter switch 280.

The entropy decoder 210 separates an intra-prediction mode index, motion information, and a quantized coefficient sequence from a coded bit stream received from the video encoder by decoding the coded bit stream. The entropy decoder 210 provides the decoded motion information to the motion compensation predictor 240, the intra-prediction mode index to the intra-predictor 230 and the inverse quantizer/inverse transformer 220, and the quantized coefficient sequence to the inverse quantizer/inverse transformer 220.

The inverse quantizer/inverse transformer 220 converts the quantized coefficient sequence to a two-dimensional array of dequantized coefficients. For the conversion, one of a plurality of scan patterns is selected based on at least one of the prediction mode (i.e. one of intra-prediction and inter-prediction) and intra-prediction mode of the current block. The intra-prediction mode is received from the intra-predictor 230 or the entropy decoder 210.

The inverse quantizer/inverse transformer 220 reconstructs quantized coefficients from the two-dimensional array of dequantized coefficients using a quantization matrix selected from among a plurality of quantization matrices. Even for blocks having the same size, the inverse quantizer/inverse transformer 220 selects a quantization matrix based on at least one of the prediction mode and intra-prediction mode of a current block. Then a residual block is reconstructed by inversely transforming the reconstructed quantized coefficients.

The adder 270 adds the reconstructed residual block received from the inverse quantizer/inverse transformer 220 to a prediction block generated from the intra-predictor 230 or the motion compensation predictor 240, thereby reconstructing an image block.

The deblocking filter 250 performs a deblocking filtering for the reconstructed image generated by the adder 270. Thus, deblocking artifact caused by image loss during quantization may be reduced.

The picture storage 260 includes a frame memory that preserves a local decoded image that has been deblocking-filtered by the deblocking filter 250.

The intra-predictor 230 determines the intra-prediction mode of the current block based on the intra-prediction mode index received from the entropy decoder 210 and generates a prediction block according to the determined intra-prediction mode.

The motion compensation predictor 240 generates a prediction block of the current block from a picture stored in the picture storage 260 based on the motion vector information. If motion compensation with fractional-pel accuracy is applied, the prediction block is generated using a selected interpolation filter.

The intra/inter switch 280 provides one of the prediction block generated from the intra-predictor 230 and the prediction block generated from the motion compensation predictor 240 to the adder 270.

Figure 8:
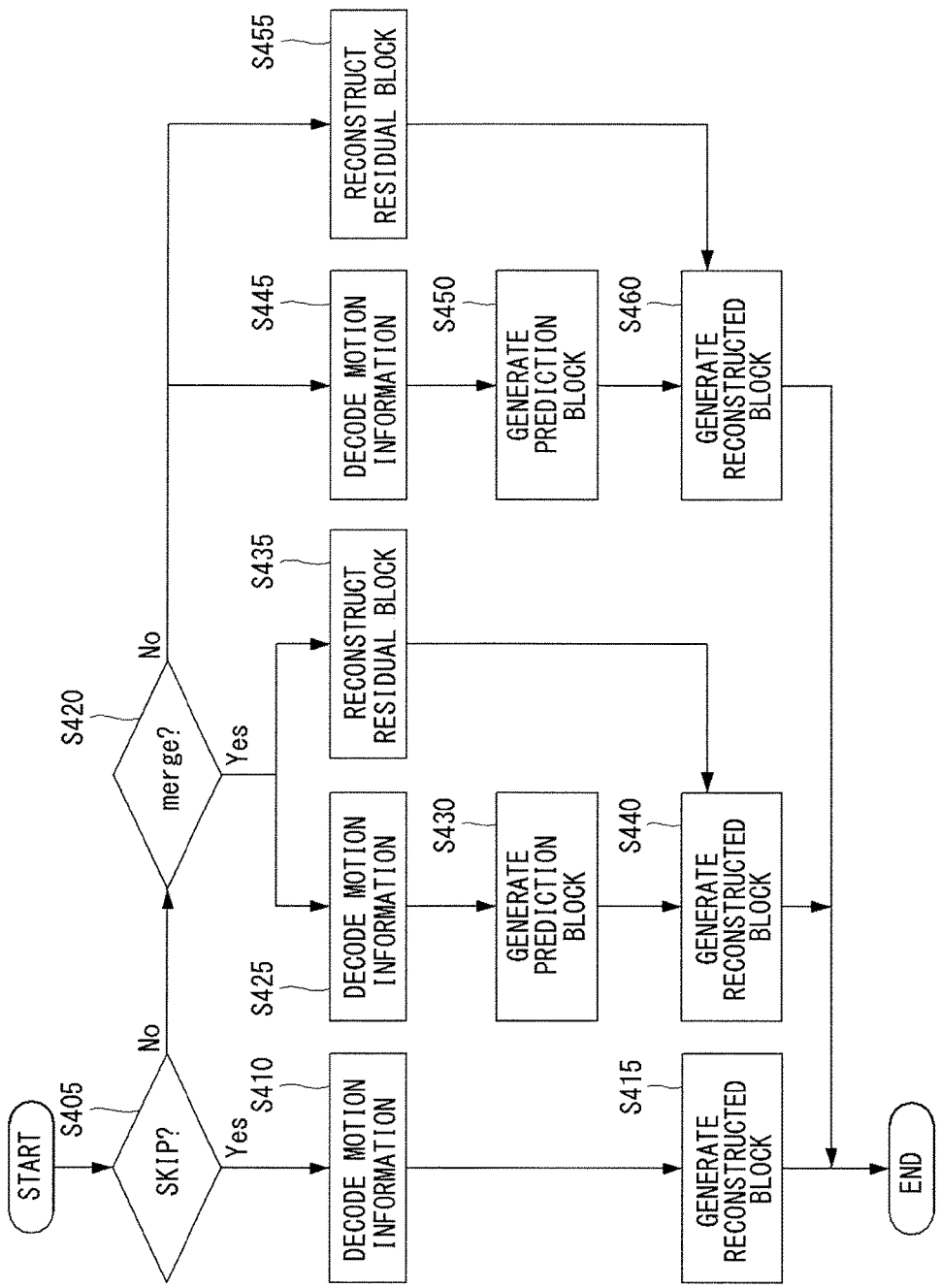
FIG. 8 is a flowchart illustrating an inter-prediction decoding operation according to an embodiment of the present invention.

FIG. 8 is a flowchart illustrating an inter-prediction decoding operation according to an embodiment of the present invention.

Referring to FIG. 8, the video decoder may check whether a current PU to be decoded has been encoded in SKIP mode (S405). The check may be made based on skip_flag of a CU.

If the current PU has been encoded in SKIP mode, the motion information of the current PU is decoded according to a Smotion information decoding process corresponding to the SKIP mode (S410). The motion information decoding process corresponding to the SKIP mode is the same as a motion information decoding process corresponding to a merge mode.

A corresponding block within a reference picture, indicated by the decoded motion information of the current PU is copied, thereby generating a reconstructed block of the current PU (S415).

On the other hand, if the current PU has not been encoded in the SKIP mode, it is determined whether the motion information of the current PU has been encoded in merge mode (S420).

If the motion information of the current PU has been encoded in the merge mode, the motion information of the current PU is decoded in the motion information decoding process corresponding to the merge mode (S425).

A prediction block is generated using the decoded motion information of the current PU (S430).

If the motion information of the current PU has been encoded in the merge mode, a residual block is decoded (S435).

Then, a reconstructed block of the current PU is generated using the prediction block and the residual block (S440).

On the other hand, if the motion information of the current PU has not been encoded in the merge mode, the motion information of the current PU is decoded in a motion information decoding process corresponding to an AMVP mode (S445).

Then, a prediction block is generated using the decoded motion information of the current PU (S450) and the residual block is decoded (S455). A reconstructed block is generated using the prediction block and the residual block (S460).

The motion information decoding process is different depending on the coding pattern of the motion information of the current PU. The coding pattern of the motion information of the current PU may be one of merge mode and AMVP mode. In SKIP mode, the same motion information decoding process as in the merge mode is performed.

First, a description will be given of a motion information decoding operation, when the coding pattern of the motion information of a current PU is the merge mode.

Figure 9:
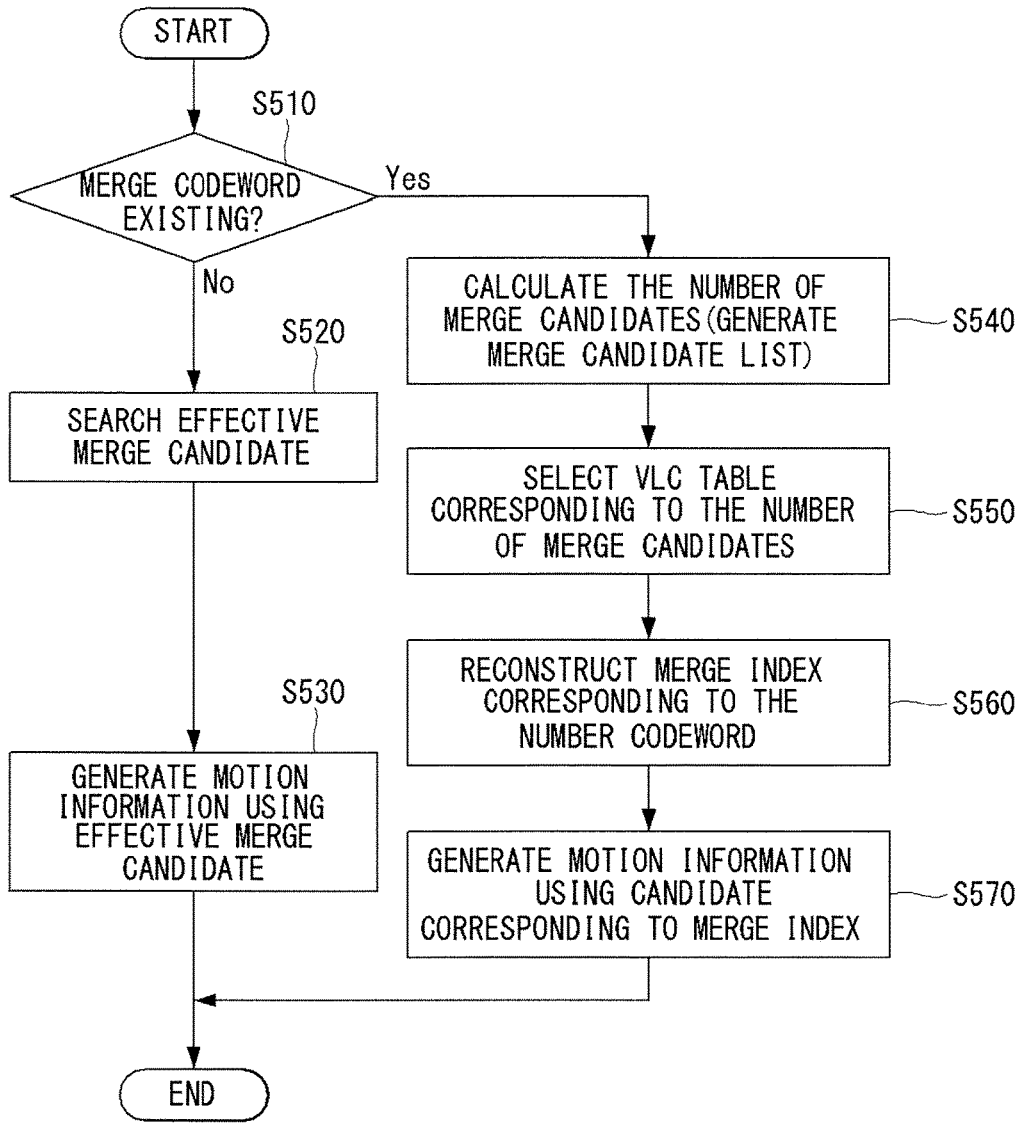
FIG. 9 is a flowchart illustrating a merge-mode motion vector decoding operation according to an embodiment of the present invention.

FIG. 9 is a flowchart illustrating a motion vector decoding operation, when the number of merge candidates is variable.

Referring to FIG. 9, it is determined whether there is any merge codeword (S510).

In the absence of a merge codeword, an effective merge candidate is searched, determining that there is a single merge candidate for the current PU (S520). Merge candidate configurations and merge candidate search orders (i.e. listing orders) have been described before with reference to FIG. 3.

Upon a search of an effective merge candidate, the motion information of the current PU is generated using the motion information of the merge candidate (S530). That is, the reference picture index and motion vector of the merge candidate are set as the reference picture index and motion vector of the current PU.

In the present of a merge codeword, effective merge candidates are searched and a merge candidate list is comprised of the effective merge candidates (S540). Methods for configuring merge candidate and generating a merge candidate list have been described before with reference to FIG. 3.

A VLC table corresponding to the number of merge candidates is selected (S550).

A merge index corresponding to the merge codeword is reconstructed (S560).

A merge candidate corresponding to the merge index is selected from the merge candidate list and the motion information of the merge candidate is set as the motion information of the current PU (S570).

Figure 10:
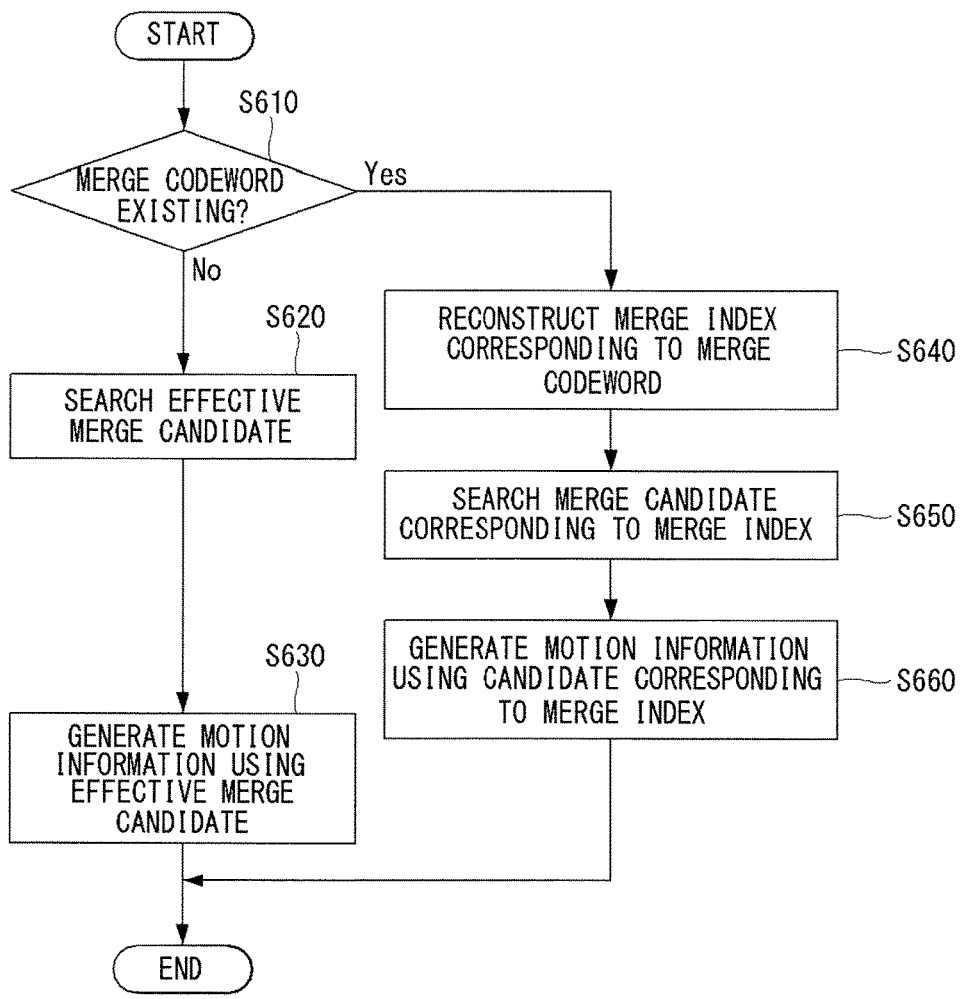
FIG. 10 is a flowchart illustrating a merge-mode motion vector decoding operation according to another embodiment of the present invention.

FIG. 10 is a flowchart illustrating a motion vector decoding operation, when the number of merge candidates is fixed. The number of merge candidates may be fixed on a picture or slice basis.

Referring to FIG. 10, effective merge candidates are searched (S610). Merge candidates include a spatial merge candidate and a temporal merge candidate. The positions of spatial merge candidates, the method for deriving the spatial merge candidates, the positions of temporal merge candidates and the method for deriving the temporal merge candidates have been described before with reference to FIG. 3. If the current PU is smaller than a predetermined size, the temporal merge candidate may not be used. For example, the merge candidate may be omitted for a 4×4 PU.

Upon a search of effective merge candidates, it is determined whether to generate a merge candidate (S620). If the number of effective merge candidates is smaller than a predetermined value, a merge candidate is generated (S630). The merge candidate may be generated by combining the motion information of effective merge candidates. A merge candidate with motion vector 0 and reference picture index 0 may be added. Merge candidates are added in a predetermined order.

A merge list is made using the merge candidates (S640). This step may be performed in combination with the steps S620 and S630. The merge candidate configurations and the merge candidate search orders (i.e. listing orders) have been described before with reference to FIG. 3.

A merge index corresponding to a merge codeword in a received bit stream is reconstructed (S650). Since the number of merge candidates is fixed, the merge index corresponding to the merge codeword may be obtained from one decoding table corresponding to the number of merge candidates. However, a different decoding table may be used depending on whether a temporal merge candidate is used.

A candidate corresponding to the merge index is searched from the merge list (S660). The searched merge candidate is determined to be a merge predictor.

Once the merge predictor is determined, the motion information of the current PU is generated using the motion information of the merge predictor (S670). Specifically, the motion information of the merge predictor, i.e. the reference picture index and motion vector of the merge predictor are determined to be the reference picture index and motion vector of the current PU.

Now a description will be given of a motion information decoding operation, when the motion information coding pattern of a current PU is AMVP.

Figure 11:
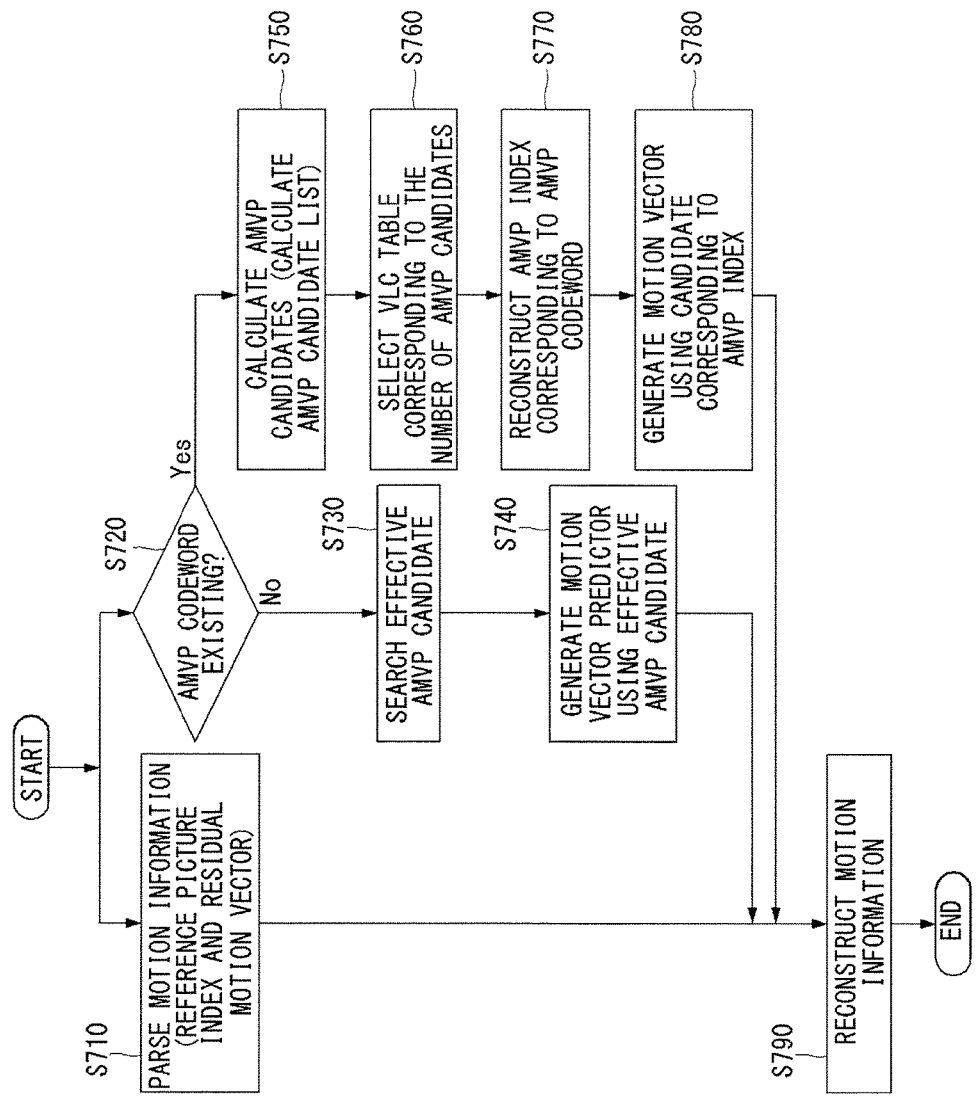
FIG. 11 is a flowchart illustrating an AMVP-mode motion vector decoding operation according to an embodiment of the present invention.

FIG. 11 is a flowchart illustrating a motion vector decoding operation, when the number of AMVP candidates is variable.

Referring to FIG. 11, the reference picture index and differential motion vector of a current PU are parsed (S710).

It is determined whether there exists an AMVP codeword (S720).

In the absence of an AMVP codeword, an effective AMVP candidate is searched, determining that the number of AMVP candidates for the current PU is 1 (S730). The AMVP candidate configurations and the AMVP candidate search orders (i.e. listing orders) have been described before in detail with reference to FIG. 6.

Upon a search of an effective AMVP candidate, the motion vector of the AMVP candidate is set as a motion vector predictor of the current PU (S740).

In the presence of an AMVP codeword, an AMVP candidate list is generated by searching effective AMVP candidates (S750). The AMVP candidate configurations and the AMVP candidate search orders (i.e. listing orders) have been described before in detail with reference to FIG. 6.

A VLC table corresponding to the number of AMVP candidates is selected (S760).

An AMVP index corresponding to the AMVP codeword is reconstructed (S770).

An AMVP candidate corresponding to the AMVP index is selected from the AMVP candidate list and the motion vector of the AMVO candidate is set as a motion vector predictor of the current PU (S780).

The sum of the motion vector predictor obtained in the step S740 or S780 and the differential motion vector obtained in the step S710 is set as a final motion vector of the current block (S790).

Figure 12:
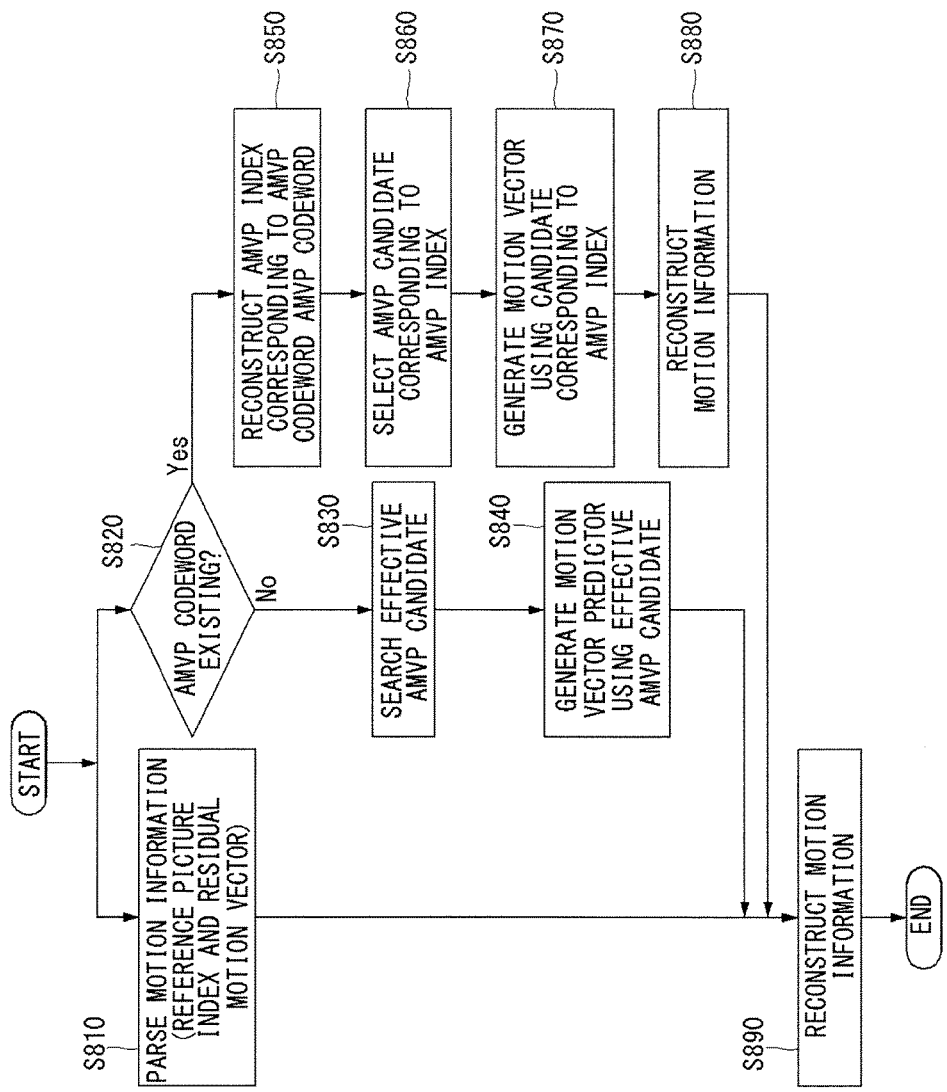
FIG. 12 is a flowchart illustrating an AMVP-mode motion vector decoding operation according to another embodiment of the present invention.

FIG. 12 is a flowchart illustrating a motion vector decoding operation, when the number of AMVP candidates is fixed.

Referring to FIG. 12, the reference picture index and differential motion vector of a current PU are parsed (S810).

Effective AMVP candidates are searched (S820). AMVP candidates include a spatial AMVP candidate and a temporal AMVP candidate. The positions of spatial AMVP candidates, the method for deriving the spatial AMVP candidates, the positions of temporal AMVP candidates, and the method for deriving the temporal AMVP candidates have been described before with reference to FIG. 6. If the current PU is smaller than a predetermined size, the temporal AMVP candidate may not be used. For example, the AMVP candidate may be omitted for a 4×4 PU.

It is determined based on the number of effective AMVP candidates whether to generate an AMVP candidate (S830). If the number of effective AMVP candidates is smaller than a predetermined value, an AMVP candidate is generated (S840). The predetermined value may be 2 or 3.

For example, in the case where there exists a spatial upper AMVP candidate, not a spatial left AMVP candidate, if an effective PU other than the spatial upper AMVP candidate exists, the motion vector of the effective PU may be added. On the contrary, in the case where there exists a spatial left AMVP candidate, not a spatial upper AMVP candidate, if an effective PU other than the spatial left AMVP candidate exists, the motion vector of the effective PU may be added. Or an AMVP candidate with motion vector 0 may be added.

An AMVP candidate list is generated using the effective AMVP candidates and/or the generated AMVP candidate (S850). The step S850 may be performed after the step S820. In this case, the step S850 follows the step S840. How to generate a candidate list has been described before with reference to FIG. 6.

An AMVP index corresponding to an AMVP codeword is recovered (S860). The AMVP index may be encoded by fixed length coding.

Then, an AMVP candidate corresponding to the AMVP index is searched from the AMVP candidate list (S870). The searched AMVP candidate is determined to be an AMVP predictor.

The motion vector of the AMVP predictor is determined to be the motion vector of the current PU (S880).

The sum of the differential motion vector obtained in the step S810 and the motion vector predictor obtained in the step S880 is set as a final motion vector of the current PU and the reference picture index obtained in the step S810 is set as the reference picture index of the current PU (S880).

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:
1. A method of encoding video data, the method comprising:
   generating, via a generator, a prediction block of a current prediction unit using a reference index and a motion vector of the current prediction unit;

generating, via the generator, a residual block using a difference between the current prediction unit and the prediction block;

transforming, via a transformer, the residual block to generate a transform block;

quantizing, via a quantizer, coefficients of the transform block to generate a quantization block using a quantization parameter, wherein the quantizer generates the quantization block by selecting two effective quantization parameters that are available and exist among left, upper, and previous quantization parameters according to an order of priority levels set for the left, upper, and previous quantization parameters and using an average of the two effective quantization parameters; and entropy-coding, via an entropy-coder, the quantization block using a scan pattern, wherein the motion vector is encoded using a motion vector predictor which is set equal to one of an effective spatial motion vector candidate and an effective temporal motion vector candidate, and wherein, when the quantized coefficients of the quantization block are divided into a plural of subset, a same scan pattern is applied to quantized coefficients of each subset.

2. The method of claim 1, wherein the scan pattern is a diagonal scan.

* * * * *